(12) United States Patent
Dabiri

(10) Patent No.: US 9,466,082 B1
(45) Date of Patent: Oct. 11, 2016

(54) VENDING MACHINE WITH USER ID/AGE VERIFICATION SYSTEM AND ASSOCIATED METHOD

(71) Applicant: Amir Dabiri, Jacksonville, FL (US)

(72) Inventor: Amir Dabiri, Jacksonville, FL (US)

(*) Notice: Subject to any disclaimer, the term of this patent is extended or adjusted under 35 U.S.C. 154(b) by 15 days.

(21) Appl. No.: 14/283,199

(22) Filed: May 20, 2014

Related U.S. Application Data

(63) Continuation-in-part of application No. 13/009,745, filed on Jan. 19, 2011, now abandoned.

(60) Provisional application No. 61/296,057, filed on Jan. 19, 2010.

(51) Int. Cl.
| | |
|---|---|
| *G06Q 30/02* | (2012.01) |
| *G06Q 30/06* | (2012.01) |
| *G06Q 20/20* | (2012.01) |
| *G06Q 20/12* | (2012.01) |

(52) U.S. Cl.
CPC .......... *G06Q 30/0617* (2013.01); *G06Q 20/12* (2013.01); *G06Q 20/202* (2013.01)

(58) Field of Classification Search
CPC ................................................. G06Q 30/0617
USPC ........................................................ 340/5.53
See application file for complete search history.

(56) References Cited

U.S. PATENT DOCUMENTS

| | | | | |
|---|---|---|---|---|
| 5,857,156 A | * | 1/1999 | Anderson | G06Q 20/341 340/7.23 |
| 2001/0026632 A1 | * | 10/2001 | Tamai | G06K 9/00 382/116 |
| 2002/0165788 A1 | * | 11/2002 | Bates | G06Q 10/087 705/16 |

* cited by examiner

*Primary Examiner* — Jennifer Mehmood
*Assistant Examiner* — Yong Hang Jiang
(74) *Attorney, Agent, or Firm* — Najafi Law, P.A.; Ashkan Najafi

(57) ABSTRACT

A system, method and computer program product offers vending machine merchandise located within a vending machine network by performing the following process: a host server of the vending machine network receiving from a first user, located at a primary keen merchandise vending machine, a request to purchase a merchandise; in response to receiving the request, the host server locating the merchandise at a secondary keen merchandise vending machine remotely located from the primary keen merchandise vending machine; the host server communicating the request to a second user belonging to a friendship network of the first user; upon receiving from the second user an acceptance to the offer, the host server notifying the first user that the acceptance of the offer was received; and the host server receiving confirmation that the second user delivered the merchandise to the first user at the pre-defined location.

12 Claims, 6 Drawing Sheets

150 a. a host server of the vending machine network receiving from a first user, located at a primary keen merchandise vending machine in communication with the vending machine network, a request to purchase a merchandise;

b. in response to receiving said request, said host server locating said merchandise at a secondary keen merchandise vending machine remotely located from said primary keen merchandise vending machine and in communication with the vending machine network;

c. said host server communicating said request to a second user belonging to a friendship network of said first user;

d. upon receiving from said second user an acceptance to said offer, said host server 66 notifying said first user that said acceptance of said offer was received; and

e. said host server receiving confirmation that said second user delivered said merchandise to said first user at said pre-defined location.

FIG. 5

160 step a. further includes the step of: receiving, from said first user, a premium that said first user will pay said second user in exchange for retrieving and delivering said merchandise to said first pre-defined location.

step b. further includes the step of: learning a quantity of said merchandise remaining at said secondary keen merchandise vending machine.

step c. further includes the step of: notifying said second user that said merchandise is located at said secondary keen merchandise vending machine as well as notifying said second user to deliver said merchandise to said pre-defined location designated by said first user.

step d. further includes the step of: notifying said first user of the first user's identity.

FIG. 6

VENDING MACHINE WITH USER ID/AGE VERIFICATION SYSTEM AND ASSOCIATED METHOD

CROSS REFERENCE TO RELATED APPLICATIONS

This application is a continuation-in-part application of U.S. patent application Ser. No. 13/009,745, filed Jan. 19, 2011, currently pending, which claims the benefit of U.S. Provisional Application No. 61/296,057, filed Jan. 19, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE DISCLOSURE

1. Technical Field

This disclosure relates to vending machines and, more particularly, to a vending machine with user ID/age verification system for providing an easy and convenient means of authenticating approved users before dispensing its products.

2. Prior Art

Vending machines provide snacks, beverages, lottery tickets, and other products to consumers without a cashier. Items sold via these machines vary by country and region. The total dollar volume spent in vending machines nationwide in the United States continued a ten-year pattern of increases. In 1994, the total vended dollar volume was $29,284,100,000. In 2004, the total vended dollar volume reached $44,190,409,000. Some types of vending machines are those that dispense personal products, typically in public toilet facilities. The machines in ladies' restrooms typically sell some form of absorbent device for menstruation such as a pad or tampon. The machines in men's rooms, when they are present, are most commonly used for the sale of condoms, though in some locations they may be found dispensing cologne, medicine, small candies, or even pornography. These are often found at toilets used by transient persons in high traffic locations, such as bus stations, shopping centers, airports and service stations.

In some countries, merchants may sell alcoholic beverages such as beer through vending machines, while other countries do not allow this practice. Sometimes a pass has to be inserted in the machine to prove one's age. In some countries like Germany and Japan, by contrast, cigarette machines are still common. Cigarettes were commonly sold in the United States through these machines, but this practice is increasingly rare due to concerns about underage buyers. The unauthorized buying of products such as alcohol and cigarettes by underage buyers will therefore require the use of an authentication system to verify a user's ID before the vending machine can dispense such product.

Accordingly, a need remains for an system in order to overcome the above-noted shortcomings. The present disclosure satisfies such a need by providing a vending machine with user ID/age verification system that is convenient and easy to use, lightweight yet durable in design, versatile in its applications, and designed for authenticating approved users before dispensing its products.

BRIEF SUMMARY OF THE DISCLOSURE

In view of the foregoing background, it is therefore an object of the present disclosure to provide system, method and computer program product for offering vending machine merchandise located within a vending machine network. These and other objects, features, and advantages of the disclosure are provided by achieving the following process: (a) a host server of the vending machine network receiving from a first user, located at a primary keen merchandise vending machine in communication with the vending machine network, a request to purchase a merchandise; (b) in response to receiving the request, the host server locating the merchandise at a secondary keen merchandise vending machine remotely located from the primary keen merchandise vending machine and in communication with the vending machine network; (c) the host server communicating the request to a second user belonging to a friendship network of the first user; (d) upon receiving from the second user an acceptance to the offer, the host server notifying the first user that the acceptance of the offer was received; and (e) the host server receiving confirmation that the second user delivered the merchandise to the first user at the pre-defined location.

In a non-limiting exemplary embodiment, step a. further includes the step of: receiving, from the first user, a premium that the first user will pay the second user in exchange for retrieving and delivering the merchandise to the first pre-defined location.

In a non-limiting exemplary embodiment, step b. further includes the step of: learning a quantity of the merchandise remaining at the secondary keen merchandise vending machine.

In a non-limiting exemplary embodiment, step c. further includes the step of: notifying the second user that the merchandise is located at the secondary keen merchandise vending machine as well as notifying the second user to deliver the merchandise to the pre-defined location designated by the first user.

In a non-limiting exemplary embodiment, step d. further includes the step of: notifying the first user of the first user's identity.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE SEVERAL VIEWS OF THE DRAWING

The novel features believed to be characteristic of this disclosure are set forth with particularity in the appended claims. The disclosure itself, however, both as to its organization and method of operation, together with further objects and advantages thereof, may best be understood by reference to the following description taken in connection with the accompanying drawings in which:

FIG. 5 is a flow chart illustrating the method steps used to perform the exemplary functions of the present disclosure; and FIG. 6 is another flow chart illustrating additional method steps used to perform the exemplary functions of the present disclosure.

Figure 1:
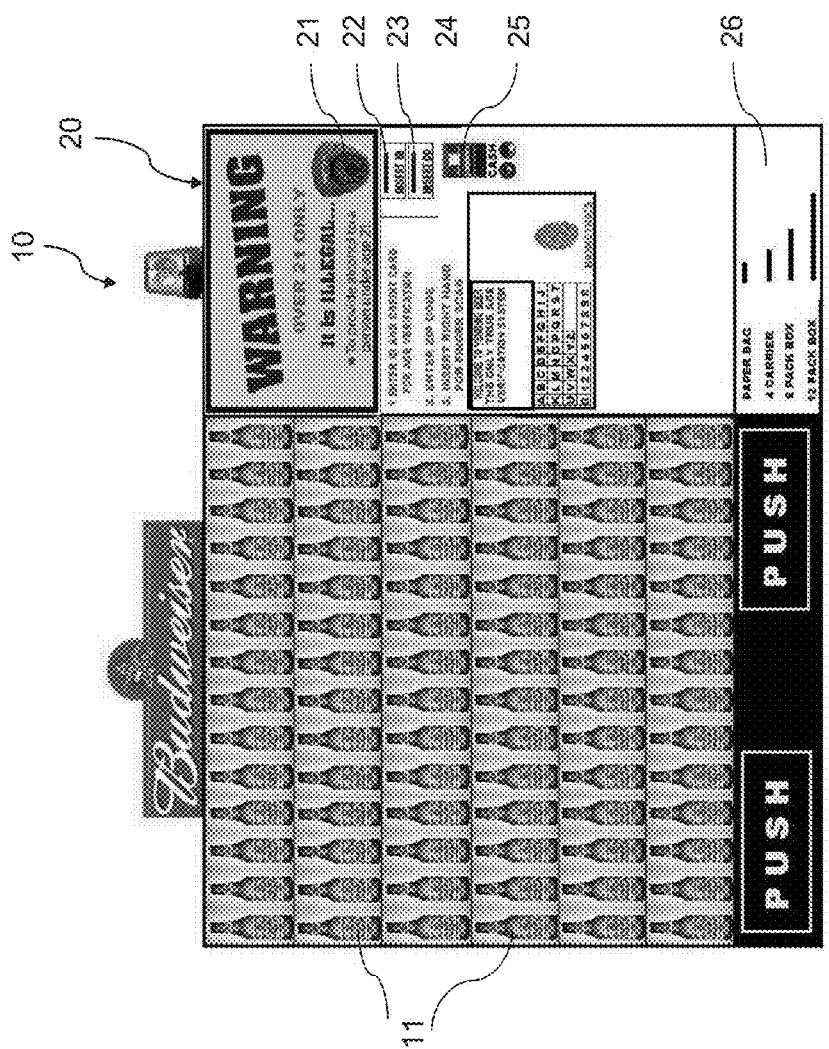
FIG. 1 is a perspective view showing a combined vending machine and computerized identity verification system, in accordance with a non-limiting exemplary embodiment of the present disclosure.

Those skilled in the art will appreciate that the figures are not intended to be drawn to any particular scale; nor are the figures intended to illustrate every embodiment of the disclosure. The disclosure is not limited to the exemplary embodiments depicted in the figures or the shapes, relative sizes or proportions shown in the figures.

DETAILED DESCRIPTION OF THE DISCLOSURE

The present disclosure will now be described more fully hereinafter with reference to the accompanying drawings, in which a preferred embodiment of the disclosure is shown. This disclosure may, however, be embodied in many different forms and should not be construed as limited to the embodiment set forth herein. Rather, this embodiment is provided so that this application will be thorough and complete, and will fully convey the true scope of the disclosure to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of system and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Figure 2:
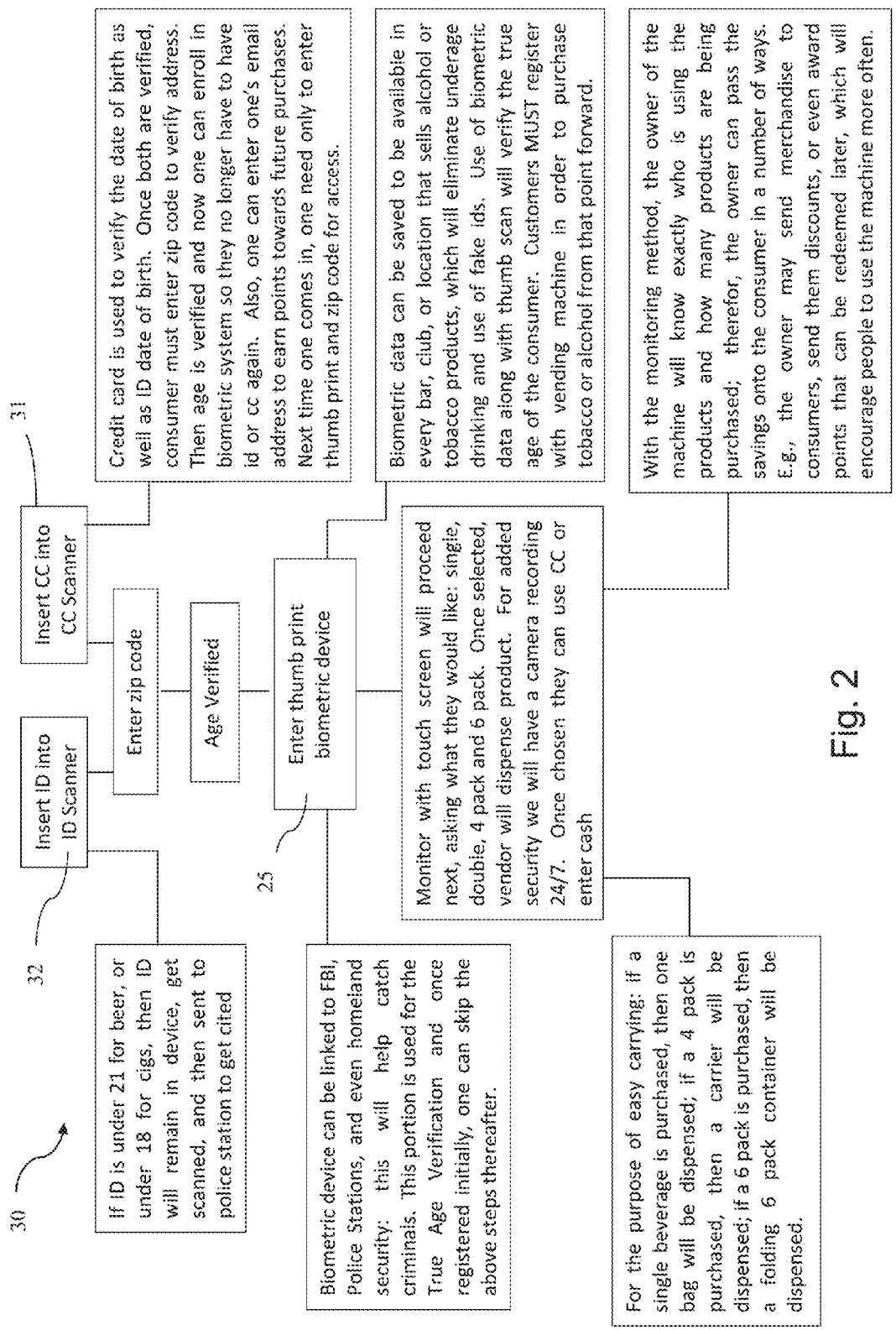
FIG. 2 is a schematic block diagram showing the control logic algorithm.
Figure 3:
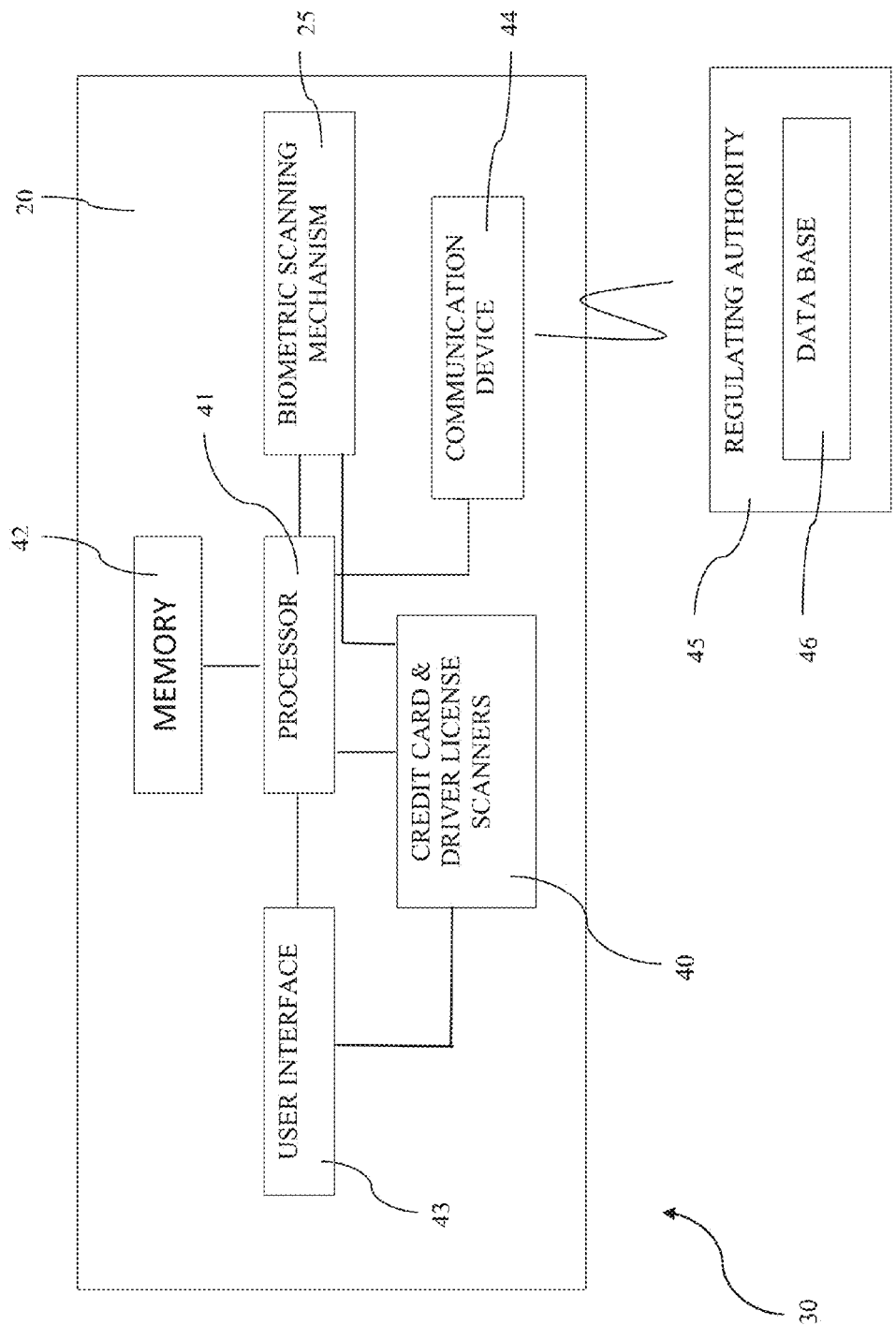
FIG. 3 is a schematic block diagram showing the computerized identity verification system.

The system of this disclosure is referred to generally in FIGS. 1-3 by the reference numeral 10 and is intended to provide a combined vending machine and computerized identity verification system. It should be understood that the combined vending machine and computerized identity verification system 10 may be used to selectively dispense a restricted product to a user.

Referring initially to FIGS. 1-3, the combined vending machine and computerized identity verification system 10 may include a vending machine 20 and a computerized identity verification system 30 communicatively coupled to the vending machine 20. The vending machine 20 may be automatically toggled between operating and non-operating modes respectively after the computerized identity verification system 30 determines the user is one of an authorized user and an unauthorized user respectively. Such an arrangement provides the unexpected and unpredictable advantage of preventing underage individuals from making a purchase from such a vending machine 20.

Referring to FIG. 1, the computerized identity verification system 30 may include a camera system 21 located at the vending machine 20 and capable of capturing an image of the user. An identification card scanner 32 may be located at the vending machine 20 and may be capable of receiving and scanning a user identification card. A credit card scanner 31 may further be located at the vending machine 20 and be capable of receiving and scanning a user credit card. The computerized identity verification system 30 may further include a biometrics scanning mechanism 25 located at the vending machine 20 and capable of scanning a fingerprint of the user. Such an arrangement provides the unexpected and unpredictable advantage of providing a multiple of user identification methods to determine the true identity of the user. For example a stolen credit card may be easily identified by the biometrics scanning mechanism 25 and an image of the user may be captured by the camera system 21 for police use.

Referring to FIG. 3, the computerized identity verification system 30 may further include a user interface 43 communicatively coupled to the credit card and identification card scanners 31, 32 respectively. A processor 41 may be located at the vending machine 20 and communicatively coupled to the user interface 43 and the biometric scanning mechanism respectively. A memory 42 may be located at the vending machine 20 and communicatively coupled to the processor 41. Such a memory 42 may include software instructions, when executed by the processor 41 to authorize the vending machine 20 to dispense the restricted product to the authorized user. Such an arrangement provides the unexpected and unpredictable advantage of allowing the system 10 to be used around the clock and on a cashless basis. The system 10 thus allows a safe way to make a purchase especially during the night or at unsafe locations where a user may be at risk of being robbed.

Again referring to FIG. 3, the computerized identity verification system 30 may further include a communication device 44 located at the vending machine 20 and communicatively coupled to the processor 41. A regulating authority 45 may be remotely located from the vending machine 20 and communicatively coupled to the communication device 44. The computerized identity verification system 30 may further include a database 46 accessible by the regulating authority 45. Such an arrangement provides the unexpected and unpredictable advantage of linking the system 10 to credit bureaus, FBI, financial institution or the like to ascertain the identity and authorized limits of the user.

Again referring to FIG. 2, the system 10 may include a control logic algorithm having the steps of: instructing the user to insert a credit card and an identification card into the credit card scanner 31 and the identification card scanner 32; verifying a user age is above a minimum threshold age by examining data contained on the credit card and the identification card; and authorizing the user to make future purchases via the biometric scanning mechanism 25. Such an arrangement provides the unexpected and unpredictable advantage of pre-approving a user for subsequent purchases so that time is not wasted in re-verifying a user each time the user makes a purchase.

The control logic algorithm may further include the steps of: if the user age is below the minimum threshold age, keeping the user credit card and identification card; and automatically reporting the user to the regulating authority 45. Such an arrangement provides the unexpected and unpredictable advantage of ensures that underage persons will not attempt to use the system 10 as their credit and identification cards may be retained for the police and their guardians' subsequent action.

The control logic algorithm may further include the step of: restricting access to the vending machine 20 unless the user provides a new identification and credit card. Such an arrangement provides the unexpected and unpredictable advantage of re-verifying unapproved users if they attempt to re-use their identification and credit cards which had been rejected.

The control logic algorithm further may include the steps of: awarding points to the user during each future purchase from the vending machine 20. Such an arrangement provides the unexpected and unpredictable advantage of retaining loyal users.

The control logic algorithm further may include the steps of: requesting and transmitting a user email address, user product preferences and user demand trends to the regulating authority 45 for storage in the database 46. Such an arrangement provides the unexpected and unpredictable advantage of gathering data for marketing, sales as well as control purposes.

The disclosure may include a method of utilizing a combined vending machine and computerized identity verification system 10 for selectively dispensing a restricted product to a user. Such a method may include the chronological steps of: providing a vending machine 20; providing and communicatively coupling a computerized identity verification system 30 to the vending machine 20; the computerized identity verification system 30 determining whether the user is one of an authorized user and an unauthorized user respectively; and automatically toggling the vending machine 20 between operating and non-operating modes respectively.

Referring to FIGS. 1-3 in general, the present disclosure 10 includes a vending machine 20 and a computerized ID/age verification system 30. The vending machine 20 may include a camera system 21 for 24/7 camera recording; and ID slot 70; a credit card slot 23; a cash insertion slot 24; a biometrics system 25 for user registration; and a dispenser 26 for dispensing products 11 such as beer for example. The biometrics system 25 may include a touch screen computer whereby user information such as email address, product preferences and demand trends may be inputted and linked to the internet and to law enforcement agencies to track such purchases. A user account page may in addition be opened to track users' purchases and credits as well as to advertise products. The computerized ID/age verification system 30 may verify a users ID and age; address; payment mode such as using a credit card or cash terms; quantity and type of purchase; approve a purchase; as well as allow the system owner to identify his clients if necessary for both commercial and security issues using biometrics technology. The system 10 owners may lease their vending machines 20 for marketing to make extra revenue and further automatically alert vendors to notify that a product is low and due for replenishment.

In one embodiment, the user ID/age verification system 30 may include using a credit card scanner 31 and a driver's license scanner 32 to check the age of a user. In this case, once age is verified then a biometric registration is required for future purchases. Notably, the vending machine system 10 preferably includes a timer whereby the identification verification mechanism is disabled during predetermined intervals.

The computerized ID/age verification system 30 may be linked to law enforcement agencies or vice versa and may advantageously provide a secure and safe purchase by providing the following:

(1) Age verified by two forms of identification;
(2) If underage, ID is kept and reported to proper sources;
(3) One time mail sent to users' home notifying they are now registered to use any vending machine without an ID from this point forward;
(4) Once registered users can skip CC and ID portion since age is verified now the only verification is in the biometrics;
(5) Point system to allow users to earn point per purchase as well as get email updates on sales or promotions from the vending company's;
(6) If user is wanted by any law enforcement agency a message will be emailed with a time and date stamp as well as vending machine location device to allow authorities to take action;

(7) Law enforcement agencies, Homeland Security or any government service will have access to users' database 46 to catch new felons or anyone who may match a fingerprint in the vending machine database 46;

(8) 24/7 days a week video recording;

(9) Internal computer will have authorized time allocated and once the cut off time for drinking is reached vending machine will turn off;

(10) Businesses that are leasing the devices or who own a vending machine can still sell before or after business hours;

(11) Owners of vending machine have direct email and addresses of consumers knowing exactly what and how much this consumer buys daily, weekly, or monthly;

(12) Two way Camera system for live interaction or real time support;

(13) Opening mechanism for staff to refill boxes via Biometric mechanism; no more keys;

(14) Real Time inventory updates for users via mobile device app that can tell you exactly what merchandise available now and you can reserve and pick up products later. Provides real time inventory management for companies to know when the merchandise needs to be restocked. Merchandise providers/depositories can keep track of refilling the machines online or via mobile device app;

(15) Mobile device app can add approved friends that are already registered to purchase age approved products or pick up products in case you cannot get to a machine;

(16) Passport scanner for US Citizens as an extra verification form so driver's license and a passport photo or a credit card for verification;

(17) Ability to withdraw cash with credit card, if machine has cash inventory;

(18) Side USB rapid charging stations for users; and

(19) Instant refund method if product gets jammed or doesn't come out. Then instantly sends a text or message to product vendor that there is a jam at the vending machine to go get it cleared up ASAP.

As an example, the user ID/age verification system 30 may include a processor 41 communicatively coupled to a memory 42. The memory 42 preferably includes programmable software instructions that include and execute a control logic algorithm, which verifies the user identity via driver license and credit card screening protocols well known in the industry. Scanners 40 are provided for scanning the driver license and credit card. A user interface 43 is communicatively coupled to the scanners 40 and processor 41 for receiving user inputs and thereafter instructing the user ID ID/age verification system 30 to operate in a desired mode based upon instructions received by the user inputs. A communication device 44 is communicatively coupled to processor 41 for transmitting signals to and from a remotely located regulating authority, which houses a database 46 containing user verification data, well known in the industry. Such a database 46 may be linked to credit bureaus databases, FBI databases, financial institution databases, etc., for example.

The processor 41 may include a microprocessor or other devices capable of being programmed or configured to perform computations and instruction processing in accordance with the disclosure. Such other devices may include microcontrollers, digital signal processors (DSP), Complex Programmable Logic Device (CPLD), Field Programmable Gate Arrays (FPGA), application-specific assimilated circuits (ASIC), discrete gate logic, and/or other assimilated circuits, hardware or firmware in lieu of or in addition to a microprocessor.

Functions and process steps described herein may be performed using programmed computer devices and related hardware, peripherals, equipment and networks. When programmed, the computing devices are configured to perform functions and carry out steps in accordance with principles of the disclosure. Such programming may comprise operating systems, software applications, software modules, scripts, files, data, digital signal processors (DSP), application-specific assimilated circuit (ASIC), discrete gate logic, or other hardware, firmware, or any conventional programmable software, collectively referred to herein as a module.

The memory 42 includes programmable software instructions that are executed by the processor 41. In particular, the programmable software instructions include a plurality of chronological operating steps that define a control logic algorithm for performing the intended functions of the present disclosure. Such software instructions may be written in a variety of computer program languages such as C++, Fortran and Pascal, for example. One skilled in the art understands that such software instructions may contain various Boolean logic processes that perform the intended function of the present disclosure. Therefore, the specific source or object code of the software program is not intended to be a limiting factor in executing the present disclosure's intended function.

The memory 42, which enables storage of data and programs, may include RAM, ROM, flash memory and any other form of readable and writable storage medium known in the art or hereafter developed. The memory 42 may be a separate component or an integral part of another component such as processor 41.

The user interface 43 may include a variety of stand-alone or shared devices that are capable of generating and transmitting a control signal upon receiving a user input. For example, exemplary user interface devices may include a remote controller employing RF, infra-red, acoustic or cellular technology, as well known in the industry. In alternate embodiments, the user interface may include a handheld computer, a PDA, a cell phone, a keyboard, a mouse, etc. that may be comprised of commercially available hardware and software operating systems, for example. The aforementioned user interfaces are intended to represent a broad category of exemplary user interfaces capable of functioning in accordance with the present disclosure. Of course, the user interfaces may include other components, peripherals and software applications provided they are compatible and capable of cooperating with remaining devices of the present disclosure. In addition, the user interfaces may include information, documents, data and files needed to provide functionality and enable performance of methodologies in accordance with an exemplary embodiment of the disclosure.

By way of example and not limitation, the communications device may communicate with the regulating authority 45 using one or more wireless LAN (WLAN) protocols, using low power, ultra wide band (UWB) communication signals or some other type of wireless signals for RF or optical (e.g., infrared) communication of information to the regulating authority 45. A real-time WLAN protocol or a standard wireless LAN protocol such as that of IEEE 802.11.times., Bluetooth or IrDA may be used without departing from the scope of the present disclosure. A local network that connects the communications device 44 to their respective local computer systems may, for example, consist of a single, unified full duplex LAN, such as a 100BaseT Ethernet LAN. Alternatively, the local network may include two or more interconnected LANs or other network communications means. Any of a variety of other types of computer systems and associated applications may be provided on the network.

Optionally, various ports and interfaces may be provided to communicate with peripherals, subsystems and systems. Such devices may include serial ports for bi-directional communications, and/or an optical communications (e.g., infrared) port for wireless line of sight communications. Other ports may include parallel and USB ports.

In an exemplary embodiment, the communications device 44 facilitates digital communications between system components, such as processor 41 and regulating authority 45. The communications device may include, but is not limited to RS232, USB, and other serial communications modules. Optionally, the device could be implemented as a wireless communications component operating according to a wireless communication protocol, such as 802.11 or IRDA.

In addition, wireless communication according to one implementation of the present disclosure may comprise radio frequency (RF), optical and/or acoustic communication equipment, employing any well known wireless communication media, techniques and protocols now known in the art or later available.

In accordance with an exemplary networked computer system, according to principles of the disclosure, includes a database server that hosts a database management system for managing a transaction database 46, including steps of writing and reading data to and from the database 46. The database 46 is communicatively coupled to the database server (not shown), and may reside on the database server or on a separate computer and/or one or more separate database storage devices.

In one embodiment, an exemplary method of operating the user ID verification system may include the following steps:

(1) Machine will have ID slot for driver license linked to police stations or DMV stations;
(2) Credit card will be entered to check age on license;
(3) If the age matched then it will ask for zip code of user to double check;
(4) When both have been verified the next step is to register for biometrics;
(5) User will enter zip code then register for biometrics;
(6) At this point users will not need their ID or CC to purchase beverages;
(7) An option of email address will be given to receive discounts on beer for future use;
(8) ID will be scanned and saved in database 46 in case of ID theft;
(9) If credit card address doesn't match driver license, then the driver license will be returned and the credit card will be retained until proof of ownership;
(10) If fake ID is read or scanned or even an underage ID is used, it will be retained in the machine or a copy of the credit card will be send to the original card holder (Note: camera will be photographing 24/7 days a week with a date and time stamp to identify user further);
(11) ID sent to DMV for wanted felons;
(12) ID will be mailed to ORIGINAL owner if stolen or fake as well as credit cards; and
(13) Police departments will have the means to make arrest or convict felons.

Notably, the system 10 may be set up in multiple locations such as hotels, sporting events, concerts, bars, restaurants, gas stations, convenient stores, malls, coliseums, stadiums, airports and liquor stores for example. Sponsors may additionally pay for marketing their products using the system 10.

In one embodiment, the vending machine and user ID/age verification system 10 may be equipped with a paper bag dispenser for single purchases. A carrier, such as a foldable box, may be dispensed for multiple purchases.

In one embodiment, an authorized user may accumulate points to get discount codes for future visits. A beer manufacturer can monitor the user's age and email address so that future products and promotions can be sent to the user.

In one embodiment, the user ID/age verification mechanism 30 reads the address and date of birth from the user's driver license. If the user's age is over 21, the user's credit card is inserted into the vending machine, wherein the user's age and address is verified again. After the user's age is verified, future purchases require only the user's zip code followed by a biometric scan for verifying the user's identity. One skilled in the art understands that various conventional biometric scanning mechanisms 49 may be employed, without departing from the true scope of the present disclosure 10.

If the user's age is under 21, the vending machine retains the driver license and/or credit card. Thereafter, the authorities are notified about the illegal attempt to purchase alcohol. The location and vending machine serial number are transmitted to the authorities. Payment is made by either cash or the pre-registered credit card of the user.

In one embodiment, the vending machine with user ID/age verification system 10 may include a cash back dispensing feature such that users may be able to draw cash from the vending machine 20 in addition to purchasing their beer or cigarettes.

Figure 4:
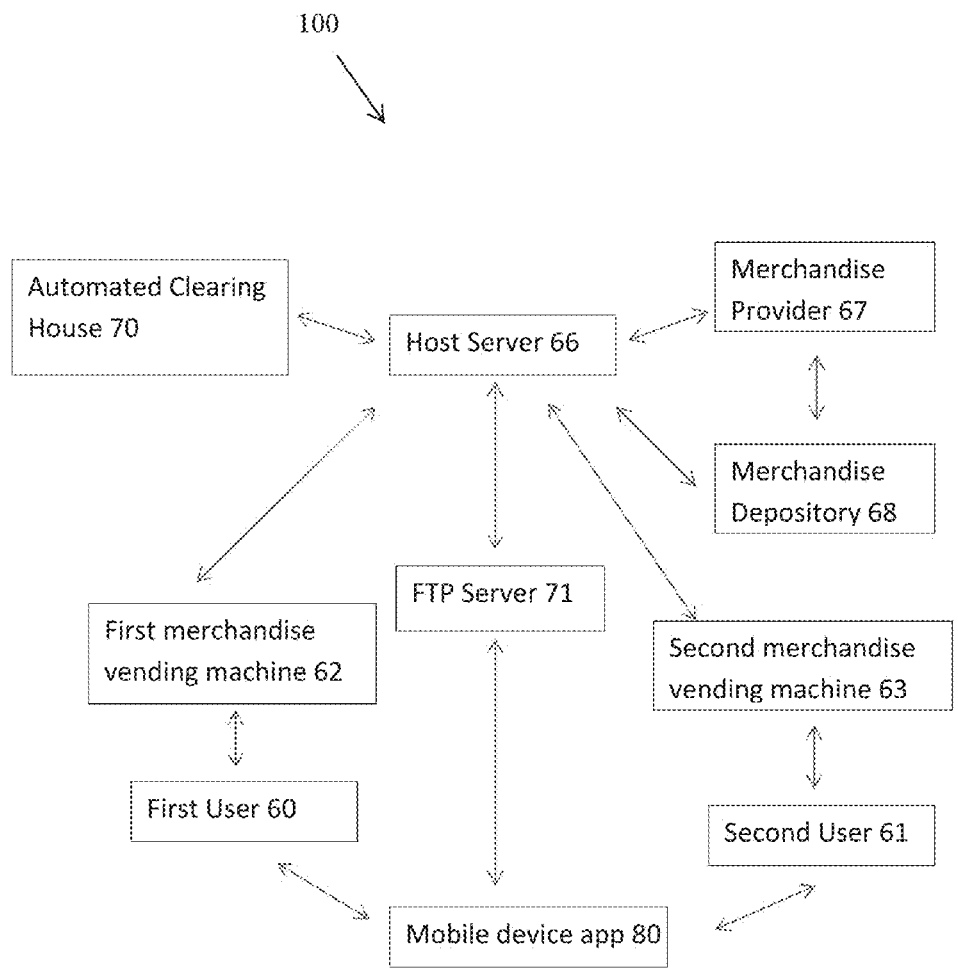
FIG. 4 is a schematic block diagram illustrating the interrelationship between the major electronic components, in accordance with a non-limiting exemplary embodiment of the present disclosure.

FIG. 4, diagrammatically illustrates the assimilated vending machine network 100 of the present disclosure. The components of the disclosure form an assimilated supply network which encompasses the entire channel of distribution for merchandise ultimately provided to users 60, 61 through first and second keen merchandise vending machines 62, 63. In the preferred application, first and second keen merchandise vending machines 62, 63 supply users 60, 61 with a variety of merchandise 65 including food, tobacco products, alcoholic beverages, digital audio/video files, etc.

As shown in FIG. 4, the entire assimilated vending machine network 100 is centered around a host server 66 which handles various functions including maintaining and managing a data base of registers for providers 67, depositories 68, first and second keen merchandise vending machines 62, 63, preparing and transmitting credit/debit files to automated clearing houses 70 for processing, receiving deposits from automated clearing houses 70, preparing and sending reports to web pages for user interface applications (e.g., mobile device app 80), and various other automated processing functions. The assimilated vending machine network 100 includes an unlimited number of keen merchandise vending machines 62, 63 each coupled to an FTP or file transfer protocol server 71 which receives, decodes and verifies the completeness of data files generated by and transferred from first and second keen merchandise vending machines 62, 63 to FTP server 71. The instructions transmitted from keen merchandise vending machines 62, 63 to FTP server 71 is automatically generated when a user 60, 61 uses merchandise vending machines 62, 63 to receive merchandise. Transaction records based upon merchandise dispensed are converted to appropriate file formats, encrypted and then transmitted over the Internet to FTP server 71. Each individual keen merchandise vending machine 62, 63 includes its own processor coupled to a communications link allowing merchandise vending machines 62, 63 to initiate calls over conventional communication protocols to connect to the Internet.

It should be noted that the computer, communications link and additional circuitry are all well known to one of ordinary skill in the electronic and computer arts and the exact combinations and methods for these components can be implemented in a variety of ways. Once the encrypted transaction records are received from merchandise vending machines 62, 63, FTP server 71 then transmits the encrypted instructions to host server 66 through standard mechanisms comprised of communications links.

As will be described later, first and second keen merchandise vending machines 62, 63 include a mechanism for receiving payment by credit, debit and/or bar code cards. One of the functions carried out through host server 66 is the processing of the payments through the credit/debit cards. To accomplish this host server 66 is communicatively coupled to an automated clearing house (ACH) 70, such as a local or national bank. Host server 66 prepares and transmits credit/debit files based on the instructions received from the individual first and second keen merchandise vending machines 62, 63 to the automated clearing house 70 for processing. Via a communications link, host server 66 then receives deposits from automated clearing house 70 to complete the payment cycle.

As part of assimilated vending machine network 100, host server 66 is coupled to providers 67, depositories 68 and user interface applications (e.g., mobile device app 80). In the preferred embodiment, merchandise vending machines 62, 63 and user interface applications (e.g., mobile device app 80) communicate with host server 66 through the Internet. The supply chain is completed by user interface applications (e.g., mobile device app 80) communicating with the various first and second keen merchandise vending machines 62, 63, again through the Internet. The preferred mechanism of electronic communication between the various components of the distribution channel is over the Internet due to its low cost and worldwide communication capabilities. While the Internet is the preferred mode of communication any type of electronic communication can be used and is contemplated by applicant. Examples of such other modes of communications include but are not limited to direct telephone lines, cellular communication, microwave, high frequency and/or digital satellite communications.

By electronically coupling host server 66 to providers 67, assimilated vending machine network 100 is capable of automatically ordering merchandise from providers 67 based upon the real time user instructions received from the individual first and second keen merchandise vending machines 62, 63. This allows for improved inventory management, capital investment and merchandise scheduling. In addition, providers 67 are able to communicate throughout assimilated vending machine network 100 to manage the real time demand for their merchandise by users 61, 62. The same applies to the various depositories 68 included within the supply network 100. Providers 67 are able to automatically, electronically manage merchandise distribution through the various merchandise vending machines 62, 63 to insure sufficient inventory is maintained at the various vending machines 62, 63. Playing a critical role in assimilated vending machine network 100 are user interface applications (e.g., mobile device app 80) has the responsibility of establishing the most merchandise-demanding locations for the individual first and second keen merchandise vending machines 62, 63.

User interface applications (e.g., mobile device app 80) are also responsible for maintaining necessary inventories of merchandise, replenishing the individual first and second keen merchandise vending machines 62, 63, responding to user demographic needs, maintenance of the merchandise vending machines 62, 63 and promoting the overall concept within their local markets embodied in the assimilated vending machine network 100 of the present disclosure. User interface applications (e.g., mobile device app 80) are tied into assimilated vending machine network 100 electronically to communicate with host server 66, providers 67, depositories 68 and individual merchandise vending machines 62, 63. As should be apparent, automated clearing house 70, providers 67, depositories 68 and user interface applications (e.g., mobile device app 80) are made up of individual businesses all linked through automated electronic computer equipment, such as personal computers or PCS, that are well known and used in almost all types of business. Although not shown, these computers typically include a communications link for communicating electronically with other computers through telephone lines, cable television lines and/or wireless mechanism such as cellular and satellite links. All of the electronic computer and communication equipment is well known to one of ordinary skill in the electronic arts. By having the entire supply chain connected electronically in one fashion or another to the plurality of first and second keen merchandise vending machines 62, 63, inventory, merchandise selection and a whole host of other business decisions can be made automatically and based on real time transactions managed at all levels.

Several examples of the efficiencies gained through assimilated vending machine network 100 are set forth as follows: host server 66 can manage a plurality of first and second keen merchandise vending machines 62, 63 and automatically order merchandise from depository 68 as needed while informing provider 67 of these actions simultaneously. Depository 68 can then automatically order needed merchandise from provider 67 in response to electronic requests from first and second users 60, 61, with host server 66 again managing this transaction. Host server 66 can also handle payment for supplies and other expenses using electronic credit and debits to the providers 67, depositories 68, users 60, 61 and user interface applications (e.g., mobile device app 80). Each of these entities can in turn issue credits and/or make payments electronically through host server 66 which then clears these transactions through automated clearing house 70.

The assimilated vending machine network 100 even allows users 60, 61 to communicate directly with host server 66 through the Internet to learn of new merchandise supply feedback via e-mail, and a whole host of other applications. While each stage of the supply network could be handled manually or in part manually, it could also be entirely automated using appropriate software thereby reducing overall transaction costs while maintaining last minute but optimal inventory and supplies within the supply network and the individual first and second keen merchandise vending machines 62, 63.

FIG. 4 discloses keen merchandise vending machines 62, 63 of the present disclosure. The front of keen merchandise vending machines 62, 63 as seen by a user includes an marketing board and/or a plurality of merchandise feed mechanisms, speaker, display, printer output, magnetic and/ or bar code card reader, a plurality of input push buttons, merchandise delivery shoot and a plurality of individual delivery doors. When a user approaches keen merchandise vending machines 62, 63 he or she is prompted by a display screen to choose a merchandise to be dispensed. Several modes are contemplated for communicating with users. First, marketing board is used to show pictures of various merchandise available within merchandise vending machines 62, 63 and can be arranged in multiple configurations. Marketing board could consist of a back lit plastic sign of pictures of various merchandise. It could also be a display case with the actual merchandise arranged for the users viewing or could even be some type of television or CRT display showing a videotaped presentation of the various merchandise. In an alternate embodiment marketing board could be replaced with a window. The actual merchandise offered for sale by merchandise vending machines 62, 63 would be arranged behind the window for viewing by users.

Several other modes of communication incorporated within merchandise vending machines 62, 63 include having the display screen indicate which merchandise are available while prompting the user for the desired merchandise. A further contemplated application would use the speaker to audibly request the customer's desired merchandise and then dispense the merchandise through the use of voice recognition technology. In a simpler embodiment merchandise vending machines 62, 63 would audibly instruct the user as to which input push button to depress. Further embodiments would include the display screen coupled with touch screen technology to allow the screen to display text and/or figures and then provide a computer with the desired selection based upon were the user touched display. Applicant contemplates any of the previously described methods of communicating with users including various combinations of these methods. The present disclosure is not to be limited to only the disclosed methods of communication. Other mechanism of communications not presently available are also contemplated as the actual mechanism of communication. Once the desired merchandise has been selected the display screen will prompt the user to pay for the merchandise. In this manner, a bi-directional (two way) audio/video communication link is established between the user and the host server 66. As with vending machines known in the prior art, the user could insert coins or dollar bills but in the preferred embodiment payment is made using credit and/or debit cards. Keen merchandise vending machines 62, 63 include a magnetic card reader which is capable of processing the credit, debit and/or bar code cards. The magnetic card/bar code reader may include a standard electro-magnetic device which reads and/or writes magnetic instructions to and from a credit/debit card which is then used to process user transactions. In the preferred embodiment the most versatile magnetic card reader will allow both read and write operations to promote the use of custom debit cards in addition to major credit cards. When equipped with write capabilities, one of the most versatile applications of magnetic card reader is that it can reprogram a debit card after each purchase until the amount stored on the debit card is depleted. In the preferred embodiment, reader will also accept and read bar codes. This feature allows users to purchase merchandise from merchandise vending machines 62, 63 without worrying about credit or debit limits. The assimilated vending machine network 100 keeps track of the users' purchases and bills the user periodically for all purchases tracked to the particular bar code providing additional convenience to users.

There are several reasons the magnetic card reader is preferred over currency devices commonly found in traditional vending machines. With so many people today carrying credit cards convenience alone is its biggest benefit. Having merchandise vending machines 62, 63 capable of processing credit card transactions also allows less traditional merchandise to be sold through vending machines 62, 63. Common vending machines are typically limited to inexpensive merchandise which must be sold at set prices usually in increments of 25 cents or 1 dollar. By accepting credit cards, merchandise vending machines 62, 63 can accept any price including odd increments allowing for more versatile pricing and a wider variety of merchandise. Because credit cards are only limited by the users available credit limit, higher priced items may also be distributed through vending machines 62, 63.

While the present disclosure is not limited to any particular merchandise the preferred embodiment is geared towards tobacco, alcohol, audio/video file markets for various types of merchandise and a wide variety of other office merchandise. Being able to accept credit card transactions allows merchandise vending machines 62, 63 to offer merchandise ranging from expensive merchandise all the way down to inexpensive flash drives, etc. Added to the versatility of merchandise vending machines 62, 63 is its ability to use debit cards to keep track of transactions or prevent unauthorized purchases and abuses by employees. A problem all too common to business of all sizes is the internal theft of office supplies by employees. Because magnetic card reader can write instructions into or read instructions from a debit card, any number of security features can be implemented. For example, a debit card can be programmed to only be valid for certain periods of time.

This type of arrangement is useful in preventing debit cards taken or stolen by former employees from being used unlawfully for too long after they are taken. The limited operating feature can also be used to prevent employees from accessing merchandise vending machines 62, 63 after hours or on weekends if such times are deemed unauthorized. Debit cards can also be programmed to only allow a certain number of transactions or transactions up to a certain dollar amount or they could require a different password to be used with the debit card. Because of their reprogrammable characteristics debit cards can incorporate almost any security combination which can be implemented using computer technology. As will be discussed later, merchandise vending machines 62, 63 is controlled by an on-board processor, which is electrically coupled to magnetic card reader to process all payment transactions.

As previously mentioned, keen merchandise vending machines 62, 63 includes a processor which electronically controls merchandise feed mechanisms, each of the plurality of dispensing devices, receipt printer, input push buttons, display and speaker. How processor controls the various input and output (I/O) devices incorporated within merchandise vending machines 62, 63 include the electrical coupling between processor and various I/O devices. The process control steps implemented by software within processor will also be described. As a convenience, a keyboard may optionally be included within a cabinet and electrically connected to processor to allow a service technician to manually enter or query processor during the manufacturing of keen merchandise vending machines 62, 63 or when servicing same at a later date.

When keen merchandise vending machines 62, 63 are initially powered, the software process starts by entering into the main menu to provide the user with various types of instructions through the display screen. The control system then waits for time out to occur. If a preset time out does lapse, the electronic control system checks to see if a predetermined time has been reached for merchandise vending machines 62, 63 to automatically initiate communications with assimilated vending machine network 100. If the predetermined time has not been reached then screen saver is activated to prevent character burn in on display screen, a common type of display damage. After the screen saver has been activated control system checks to see if an input or interrupt request has occurred, and if so a welcome screen is displayed. Control is then returned to main menu. If an input or interrupt request has not occurred control of the process returns to checking for a predetermined communication time. This control loop will continue indefinitely until certain other conditions have been met.

If, during operation, control system detects the predetermined time for automatic communications, has been reached it will then communicate to Internet server, log on to the FTP server, transmit the daily transaction history from keen merchandise vending machines 62, 63, update its own internal operating files and then execute any command files provided from host server of assimilated vending machine network 100. As described previously, control of the process then returns to the start and back to main menu.

If time out does not elapse, control system then will check control card scanner to see if maintenance personnel are in the process of restocking the inventory within merchandise vending machines 62, 63. If a maintenance control card is detected merchandise vending machines 62, 63 enter inventory management mode during which time maintenance personnel are prompted to enter the inventory quantity adjustment values.

Maintenance personnel are prompted to continue updating the inventory until complete, at which point control of the process returns to start and main menu. If time out does not elapse and a maintenance control card is not detected then control system enters the order menu which prompts the user through the various interface devices such as display screen, to enter the item, quantity, and/or other options for the desired merchandise. Once entered, the user is prompted to review the order and indicate at whether or not his or her order is complete. If the order is not complete order menu is repeated. If the order is complete merchandise vending machines 62, 63 requests credit card payment from the user. Once the user swipes his or her credit, debit or bar code card through magnetic/bar code card reader, credit verification takes place. Upon approval, the merchandise is dispensed and if requested by the user a receipt is printed.

Whether a receipt is printed or not, control is returned to start and back to main menu. If through credit card verification the customer's credit card is not approved the user is once again prompted for payment. Due to the unlimited flexibility of computers generally and electronic control system of the present disclosure, one of ordinary skill in the electronic and computer control arts will easily recognize that hundreds of variations on the process control can be accomplished simply through variations in the software which directs control system. The present disclosure is not to be limited to only the process steps and perimeters disclosed. The novelty of the present disclosure lies in the combination of keen merchandise vending machine 62, 63 in communication with a host server 66 to locate unavailable merchandise at another location of vending machines 62, 63 wherein a network of "friended" users can collaborate and deliver unavailable merchandise to pre-defined locations, as described hereinbelow.

Referring to FIGS. 4-6, a system, method and computer program product for offering vending machine merchandise located within a vending machine network 100 are provided by achieving the following process 150: (a) a host server 66 of the vending machine network 100 receiving from a first user 60, located at a primary (first) keen merchandise vending machine 62 in communication with the vending machine network 100, a request to purchase a merchandise; (b) in response to receiving the request, the host server 66 locating the merchandise at a secondary (second) keen merchandise vending machine 63 remotely located from the primary (first) keen merchandise vending machine 62 and in communication with the vending machine network 100; (c) the host server 66 communicating the request to a second user 61 belonging to a friendship network of the first user 60; (d) upon receiving from the second user 61 an acceptance to the offer, the host server 66 notifying the first user 60 that the acceptance of the offer was received; and (e) the host server 66 receiving confirmation that the second user 61 delivered the merchandise to the first user 60 at the pre-defined location.

In a non-limiting exemplary embodiment, process 160 is further defined wherein step a. further includes the step of: receiving, from the first user 60, a premium that the first user 60 will pay the second user 61 in exchange for retrieving and delivering the merchandise to the first pre-defined location. As an example, the premium may be a dollar value, a portion of the merchandise, or any other product/service (tangible or intangible) that has value.

In a non-limiting exemplary embodiment, step b. further includes the step of: learning a quantity of the merchandise remaining at the secondary (second) keen merchandise vending machine 63. If host server 66 determines a more remotely located merchandise vending machine has a higher inventory of the merchandise, the host server 66 may direct the second user 61 to such a vending machine even though a closer vending machine has a lesser inventory of the merchandise, thereby reducing the risk of having the second user 61 reach the closer vending machine after its inventory is depleted.

In a non-limiting exemplary embodiment, step c. further includes the step of: notifying the second user 61 that the merchandise is located at the secondary (second) keen merchandise vending machine 63 as well as notifying the second user 61 to deliver the merchandise to the pre-defined location designated by the first user 60. The pre-defined location may be the first merchandise vending machine 62, the first user's home, a neutral site, etc.

In a non-limiting exemplary embodiment, step d. further includes the step of: notifying the first user 60 of the first user 60 identity. Thus, the first user 60 may have a photo of the second user 61 prior to receiving the merchandise.

What is claimed as new and what is desired to secure by Letters Patent of the United States is:

1. A method for offering vending machine merchandise located within a vending machine network, said method comprising the steps of:
   a. a host server of the vending machine network receiving from a first user, located at a primary keen merchandise vending machine in communication with the vending machine network, a request to purchase a merchandise;
   b. in response to receiving said request, said host server locating said merchandise at a secondary keen merchandise vending machine remotely located from said primary keen merchandise vending machine and in communication with the vending machine network;

c. said host server communicating said request to a second user belonging to a friendship network of said first user and notifying said second user that said merchandise is located at said secondary keen merchandise vending machine as well as notifying said second user to deliver said merchandise to said pre-defined location designated by said first user;

d. upon receiving from said second user an acceptance to said offer, said host server notifying said first user that said acceptance of said offer was received; and e. said host server receiving confirmation that said second user delivered said merchandise to said first user at said pre-defined location.

2. The method of claim 1, wherein step a. further comprises the step of:
receiving, from said first user, a premium that said first user will pay said second user in exchange for retrieving and delivering said merchandise to said first pre-defined location.

3. The method of claim 2, wherein step b. further comprises the step of:
learning a quantity of said merchandise remaining at said secondary keen merchandise vending machine.

4. The method of claim 3, wherein step d. further comprises the step of:
notifying said first user of the second user's identity.

5. A computer program product embodied in a non-transitory computer readable medium for offering vending machine merchandise located within a vending machine network, said computer program product comprising:
first computer readable program codes a host server of the vending machine network receiving from a first user, located at a primary keen merchandise vending machine in communication with the vending machine network, a request to purchase a merchandise;
second computer readable program codes for, in response to receiving said request,
said host server locating said merchandise at a secondary keen merchandise vending machine remotely located from said primary keen merchandise vending machine and in communication with the vending machine network;
third computer readable program codes for said host server communicating said request to a second user belonging to a friendship network of said first user and notifying said second user that said merchandise is located at said secondary keen merchandise vending machine as well as notifying said second user to deliver said merchandise to said pre-defined location designated by said first user;
fourth computer readable program codes for, upon receiving from said second user an acceptance to said offer, said host server notifying said first user that said acceptance of said offer was received; and
fifth computer readable program codes for said host server receiving confirmation that said second user delivered said merchandise to said first user at said pre-defined location.

6. The computer program product of claim 5, wherein said first computer readable program codes further comprises:
sixth computer readable program codes for receiving, from said first user, a premium that said first user will pay said second user in exchange for retrieving and delivering said merchandise to said first pre-defined location.

7. The computer program product of claim 6, wherein said second computer readable program codes further comprises:
seventh computer readable program codes for learning a quantity of said merchandise remaining at said secondary keen merchandise vending machine.

8. The computer program product of claim 7, wherein said fourth computer readable program codes further comprises:
ninth computer readable program codes for notifying said first user of the second user's identity.

9. A system for offering vending machine merchandise located within a vending machine network, said system comprising:
a host server;
a primary keen merchandise vending machine in communication with the vending machine network;
a secondary keen merchandise vending machine remotely located from said primary keen merchandise vending machine and in communication with the vending machine network;
means for said host server of the vending machine network receiving from a first user,
located at said primary keen merchandise vending machine, a request to purchase a merchandise;
means for in response to receiving said request, said host server locating said merchandise;
means for said host server communicating said request to a second user belonging to a friendship network of said first user and means for notifying said second user that said merchandise is located at said secondary keen merchandise vending machine as well as notifying said second user to deliver said merchandise to said pre-defined location designated by said first user;
means for upon receiving from said second user an acceptance to said offer, said host server notifying said first user that said acceptance of said offer was received; and
means for said host server receiving confirmation that said second user delivered said merchandise to said first user at said pre-defined location.

10. The system of claim 9, further comprising:
means for receiving, from said first user, a premium that said first user will pay said second user in exchange for retrieving and delivering said merchandise to said first pre-defined location.

11. The system of claim 10, further comprising:
means for learning a quantity of said merchandise remaining at said secondary keen merchandise vending machine.

12. The system of claim 11, further comprising:
means for notifying said first user of the second user's identity.

* * * * *